Dec. 16, 1941.  J. M. MILAN  2,266,059
DISK BRAKE
Filed June 29, 1940   2 Sheets-Sheet 1

INVENTOR
Joseph M. Milan.
BY Dike, Calver & Gray
ATTORNEYS.

Dec. 16, 1941.   J. M. MILAN   2,266,059
DISK BRAKE
Filed June 29, 1940   2 Sheets-Sheet 2
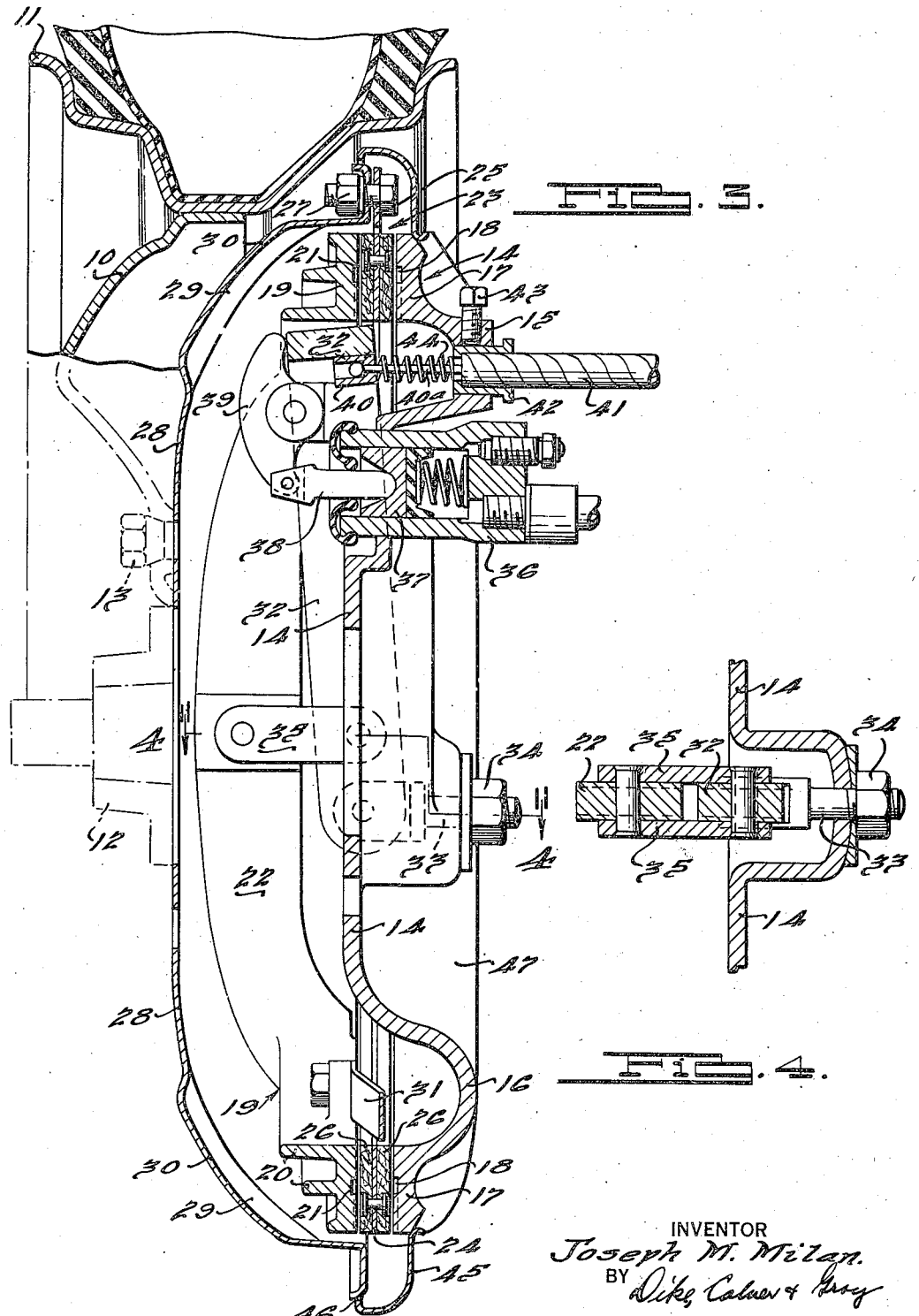
INVENTOR
Joseph M. Milan.
BY
ATTORNEYS.

Patented Dec. 16, 1941

2,266,059

UNITED STATES PATENT OFFICE 2,266,059

DISK BRAKE

Joseph M. Milan, Highland Park, Mich.

Application June 29, 1940, Serial No. 343,092

11 Claims. (Cl. 188—72)

The present invention relates to new and useful improvements in vehicle brakes of the type commonly referred to as disk brakes.

Heretofore various operating parts of disk brakes have been made of relatively heavy materials such as cast iron or steel. While disk brakes thus constructed have provided a greater braking surface than brakes of equal diameter in other types, they have possessed relatively high weights and relatively unsatisfactory cooling systems as well as being unduly complicated in structure at the same time.

Accordingly, it is one object of the present invention to provide a rugged satisfactory disk brake in which the backing plate, or the pressure plate, or both are formed of a strong but light aluminum alloy; and to provide improved cooling means for a disk brake utilizing this material. In this connection, a brake embodying the present invention is more effectively and more rapidly cooled than other disk brakes utilizing former cooling means. Moreover, a brake embodying the present invention is cooled practically entirely by an air stream passing over the sources of heat generation as contrasted with cooling solely by heat conduction through metallic parts.

Another object of the invention is to provide a disk brake of simplified construction but one which is effective in operation, readily serviced and adjusted in use and which has a relatively long operating service life with a minimum of required adjustments.

It is a further object of the invention to provide improvements and simplifications in a disk brake operating mechanism which render this mechanism positive and prompt in applying the brake without undesirable play or delayed action. Furthermore, the present invention provides for the actuation of the brake by hydraulic mechanisms, mechanical link and lever systems, and combinations thereof in one operating system, or independently operating systems. For instance, according to the present invention, the brake may be operated normally by a hydraulic mechanism controlled by a foot pedal in the vehicle, and also effectively but independently operated by a mechanical link and lever system controlled from a hand lever or so-called emergency brake.

Other objects and advantages of this invention will appear in the following description and appended claims, reference being had to the accompanying drawings forming a part of this specification wherein like reference characters designate corresponding parts in the several views.

Fig. 3 is an enlarged section taken substantially along the staggered section line 3—3 of Fig. 1 in the direction of the arrows.

Fig. 4 is a fragmentary section taken substantially along the staggered section line 4—4 of Fig. 3 in the direction of the arrows.

Figure 1:
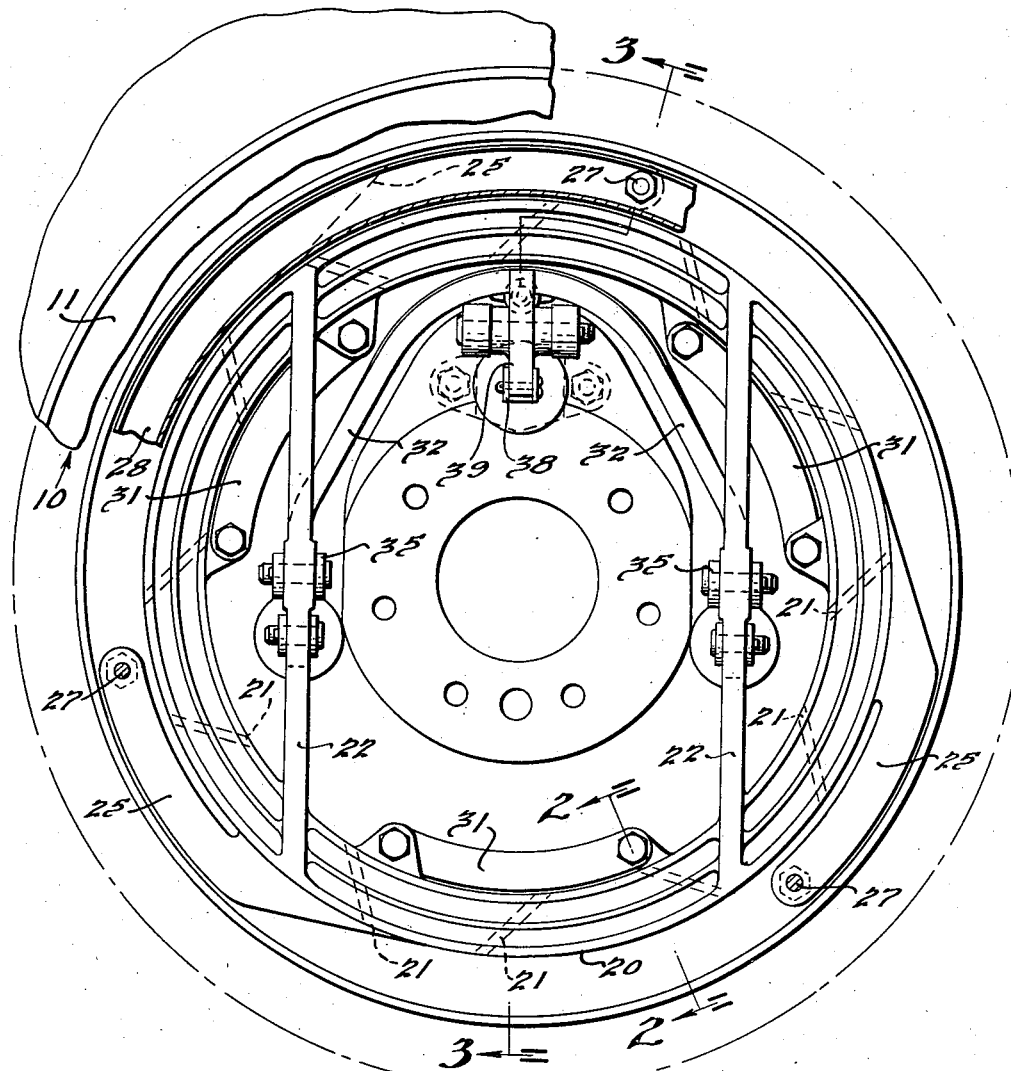
Fig. 1 is an elevation, with parts broken away, of a brake embodying the present invention showing a fragmentary elevation of a portion of the vehicle wheel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A disk brake embodying the present invention consists essentially of the following elements:

A stationary backing plate, a pressure plate spaced from the backing plate and movable relative thereto, and a friction member or disk provided with braking surfaces and interposed in the space between the pressure and backing plates. This friction member is connected for rotation with the vehicle wheel. In addition, brake applying means is provided and braking action is accomplished by moving the pressure plate toward the backing plate to engage the surfaces of the rotating friction disk between the non-rotating pressure plate and the stationary backing plate.

Referring more expressly to the present invention, one embodiment thereof is illustrated in the accompanying drawings and is applied to a vehicle wheel 10 of conventional construction. The wheel 10 is provided with the usual rim 11 and is secured to a hub 12 as by studs 13 (Fig. 3). The hub 12 is mounted for rotation on an exle which is not shown in the drawings but which may, for instance, be the stub axle attached to the conventional steering spindles used on the front wheels of an automobile.

The brake of the present invention includes a stationary backing plate 14 which is mounted on a non-rotating part of the vehicle structure. For instance, it may be attached to a bracket carried on the steering spindle (not shown). The backing plate 14 is preferably formed of a light but strong aluminum alloy and is shaped as best illustrated in Fig. 3; that is, it is generally annular in shape and is provided with offset portions shown at 15 and 16 which terminate in a peripheral flanging 17. Within the inner surface of this flanging 17, a plurality of slots 18 (Fig. 3) are formed. These slots extend from the outer edge of the annular plate 14 to the open space beneath the offset portions 15 and 16.

The reference numeral 19 represents a pressure plate which is also preferably formed of a light but strong aluminum alloy. The pressure plate is annular in shape and is provided with ribs or fins 20 extending concentrically about its outer surface, see Fig. 2. Also, the pressure plate 19 is provided with slots 21 generally similar to the slots 18 in the backing plate 14. These slots extend from the periphery of the annular plate 19 to the open central portion thereof as clearly indicated in Fig. 1. In addition, the pressure plate 19 is provided with connecting pieces 22 extending across its open center portion.

Figure 2:
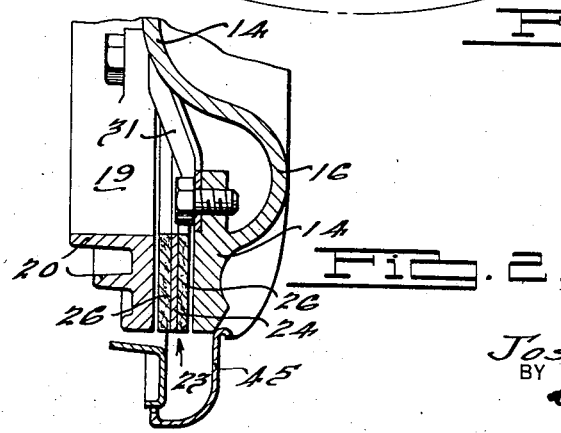
Fig. 2 is a fragmentary section taken substantially along the line 2—2 of Fig. 1 in the direction of the arrows.

The pressure plate 19 is mounted on and is maintained in spaced relation to the backing plate 14 by a plurality of spring strap members 31, see Fig. 2. These spring strap members are resilient and yieldingly oppose any decrease in spacing between the adjacent faces of the pressure plate 19 and the backing plate 14. Decrease in spacing of the pressure plate 19 relative to the backing plate 14 is required for application of the brake and is accomplished by the brake applying mechanism more fully described hereinafter.

A friction member or disk indicated generally by the reference numeral 23 is mounted for rotation with the hub 12 and is resiliently suspended in the space between the backing plate 14 and the pressure plate 19. The friction disk 23 in the present embodiment consists of an annular metal plate 24 which is provided with a plurality of tangential arms 25 which, when mounted at their free ends to a supporting carrier, permit a resilient movement of the disk 23 due to a flexing of the arms 25. Disks of friction brake lining 26 are secured on opposite sides of the metal plate 24 as by rivets which extend through the friction disks and through the metal plate as clearly shown in Fig. 3. The free ends of the tangential arms 25 are secured by a suitable securing means, as for example, the nuts and bolts 27, to an air induction member 28 (Fig. 3) which in turn is secured to the hub 12 by any suitable means The air induction member 28 is provided with a plurality of air induction openings or ports 29 adjacent which a plurality of pressed-out louvers or scoops 30 are provided. Upon rotation of the hub 12 and the air induction member 28, air is scooped into the brake by the action of the louvers 30.

The brake applying mechanism of the present embodiment includes a bent lever or a yoke 32 which is pivotally mounted on adjustable pivot brackets 33, see Fig. 4. The backing plate 14 is provided with a recessed portion within which the pivot brackets 33 are mounted. Furthermore, it will be noted that the pivot brackets are adjustable; for they are screw threaded and engage an adjusting nut 34 for the purpose of varying the position of the brackets and of the yoke 32 relative to the backing plate 14. The adjusting nut 34 may be held in adjusted position by contact with a suitable locking washer as shown in Fig. 4.

To the yoke 32 there is pivotally attached near each of its ends a pair of links or connecting members 35—35 (Fig. 4). These links are also pivotally attached to the connecting pieces 22 of the pressure plate in the manner clearly shown in Fig. 3. Accordingly, it will readily be understood that movement of the yoke 32 about its pivotal connections to the brackets 33 will pull the pressure plate 19 in the direction of the backing plate 14 by means of the links 35 which act as articulated connections between the yoke 32 and the pressure plate 19. Thus it will be understood that the pressure plate may be moved into direct engagement with the adjacent face of the friction lining 26 of the friction member 23. It will also be noted that upon contact with the friction lining the pressure plate 19 is allowed to move circumferentially to a limited extent due to the flexing of the spring strap members 31.

The movement of the yoke 32 may be accomplished by any suitable type of brake operating means such for example, as a hydraulic mechanism. A suitable hydraulic mechanism is here shown and comprises a hydraulic cylinder 36 which is firmly mounted in the backing plate 14. A piston 37 is movable in the cylinder 36 by hydraulic fluid applied through the hydraulic system. A stud 38 carried by the piston 37 moves therewith. The stud 38 is pivotally connected to one arm of a pivoted lever 39 (Fig. 3) which has its other arm in contact with the yoke 32. Therefore, as the piston 37 is moved toward the yoke 32, the pivoted lever 39 is swung by the stud 38 and causes the yoke 32 to pivot about its pivotal connection with the brackets 33 and to move in the direction of the backing plate 14. As pointed out hereinbefore, such movement of the yoke 32 is transferred by the links 35 to the pressure plate 19 and causes the pressure plate to move into braking engagement with the frictional brake lining 26 on the rotating friction member 23 and presses the said friction member between the non-rotating pressure plate and the stationary backing plate thereby accomplishing braking action.

To the underside of the yoke 32 is attached, as by welding, a socket 40 (Fig. 3). Within the socket 40 is maintained a bolt 40a for connecting the end of a cable 41 to the socket 40, and therefore to the yoke 32. The cable 41 is held within the backing plate 14 by suitable means such as the socket 42 and the set screw 43. A spring 44 is interposed between the socket 40 and the socket 42 and surrounds the bolt 40a. The spring 44 is preferably a compression spring and it will be noted that movement of the yoke 32 in the direction of the backing plate 14 to actuate the braking mechanism compresses the spring 44. Consequently, whether the yoke 32 is operated by pulling the cable 41 or by the hydraulic means explained hereinbefore, the spring 44 will return the yoke 32 and the other operating parts of the brake including the pressure plate 19, to a non-braking position on release of brake applying forces. It will be understood that the spring 44 may be located at other suitable places providing that it is loaded on applying the brake and thus adapted to return the operating parts of the brake on release of the applying forces. However, it is preferably located around the bolt 40a since it also functions, when so located, to prevent binding of the cable 41 in the brake mechanism.

In order to close the interior of the brake against the entrance of foreign material, a stamped plate 45 is provided and is secured to the backing plate 14. This plate 45 is secured at its other edge to a flange extending from the air induction member 20 as clearly shown in Figs. 2 and 3. Near this connection, however, a port or opening 46 is provided in the plate 45 and is utilized to permit an escape of air circulating throughout the interior of the brake.

As will be understood from the foregoing description, the present invention provides a construction in which the air induction member 20 upon rotation of the hub 12 draws air into the interior of the brake chamber through the openings 29. This air washes the surfaces of the pressure plate 19 and particularly the heat radiating fins 20 thereon. Also, part of this air is forced through the slots 21 in the pressure plate 19 and also through the slots 18 in the backing plate 14. The air is discharged through the port or opening 46. Heat generated during contact of the pressure plate and backing plate with the friction member 23 is removed by this air flow through the interior of the brake. Moreover, due to the slots 21 and 18 this heat is effectively removed at the source of its generation; namely, the contacting surfaces of the friction disk 23, the pressure plate 19, and the backing plate 14. This cooling means for the brake has been found to be particularly effective when the pressure plate and the backing plate are formed of an aluminum alloy, since aluminum does not conduct heat as readily as other metals such as iron or steel. Consequently heat cannot be very effectively removed by radiation from parts of the brake formed of aluminum. However, the aforementioned air flow is effective for removing heat which would otherwise accumulate in the aluminum pressure plate and backing plate through failure to be conducted away. In addition to the foregoing cooling means the backing plate may, if desired, be provided with heat radiating fins 47 on its outer surface. These fins may be utilized to aid in removing whatever heat is conducted through the backing plate, since it is evident that some heat will be so conducted despite the relatively poor heat conductivity of aluminum.

Thus it will be understood that a brake embodying the present invention provides an especially light brake mechanism, in particular, a light backing and pressure plate. However, the structure is a sturdy one and the pressure and backing plates are not warped during operation of the brake principally because the heat removing means of the present invention is very effective. Also, the brake applying means applies forces substantially uniformly to the pressure plate and the backing plate. Moreover, a brake embodying the present invention possesses the advantages commonly attributed to disk brakes including a greater braking surface area than a conventional shoe and drum type brake for a brake of a comparable size. Moreover, the present braking mechanism is of a simplified construction and is readily adjustable. On comparative tests a brake embodying the present invention has proved to be more positive in operation than other types of brakes, as well as possessing a longer operating service life with fewer required adjustments.

It will be observed from the foregoing that the braking surface itself is formed of the aluminum or aluminum alloy which is used in the construction of the backing plate or the pressure plate or both. It is believed that the use of aluminum or an aluminum alloy to provide the friction engaging surfaces on said plate is a novel feature of the present invention. The use of aluminum, which is highly polished by the action of the friction member, for the friction engaging surfaces of the pressure plate and the backing plate, is rendered possible through the effective cooling of the interior of the brake which is permitted by the brake structure embodying the present design. In tests which have been run on brakes of this type, it has been found that the brake is at all times relatively much cooler than brakes of conventional design or of brakes comparable to the present design in which a ferrous metal such as cast iron or steel is used to form the braking surfaces.

While I do not desire to be bound by my theory for this phenomenon, it is my belief that the highly polished surfaces of the aluminum on the pressure plate and the backing plate at the points where they come in contact with the friction lining act in effect as a heat reflecting surface which reflects the heat rays away from the pressure plate and the backing plate and reflected heat rays are absorbed in the moving air streams which at all times are provided adjacent the braking surfaces.

The efficiency of highly polished aluminum in reflecting heat is well known, as is evidenced by its use in the building industry to provide thermal insulation of building constructions. It is my belief that the highly polished aluminum surfaces of the friction disk engaging members is a new and unexpected result which flows from the use of aluminum or an aluminum alloy in a brake of the present type. Thus, in addition to providing a brake which is relatively much lighter in weight than a comparable brake construction formed from a ferrous metal, it will be seen that the brake construction of the present invention also possesses an additional novel feature in that the brake applying surfaces are formed of aluminum or an aluminum alloy. It has also been noted that the use of aluminum on these surfaces tends to prevent cracking, checking and scaling of the surfaces of the metal as is so often noticed when ferrous metals are used and the brake is caused to overheat. This results in a longer life of the brake linings or friction members used in the construction of the brake embodying the present invention.

I claim:

1. A vehicle brake mechanism having a stationary plate formed of an aluminum alloy, an additional plate also formed of an aluminum alloy mounted on and spaced from said stationary plate for movement relative thereto, a rotatable friction member resiliently suspended in the space between said plates, brake operating means for moving said additional plate toward said stationary plate to engage said friction member between said stationary plate and said additional plate, and means including a rotatable air induction member connected to a vehicle wheel for driving said rotatable friction member and for cooling said brake.

2. A vehicle brake mechanism having a stationary backing plate, an aluminum alloy pressure plate resiliently mounted on said backing plate for limited movement relative thereto, a rotatable friction disk comprising an annular supporting plate having friction disks secured to opposite sides thereof and having a plurality of spaced resilient arms for suspending said friction disk between said backing plate and said pressure plate, brake operating means adapted to move said pressure plate toward said backing plate to engage the braking surfaces of said friction member between said pressure plate and said backing plate, and means for dissipating the heat created in said brake during the engagement of said pressure plate, friction disk and backing plate and including slots formed across the surface of said pressure plate facing said friction disk and a rotatable air induction member driven from the vehicle hub for forcing air through said slots and about said pressure plate for cooling the brake mechanism.

3. A brake mechanism having an aluminum alloy stationary backing plate, an aluminum alloy pressure plate resiliently mounted on said backing plate for limited movement axially and circumferentially thereof, a rotatable friction disk comprising an annular supporting plate having friction disks secured to opposite sides thereof and having a plurality of spaced resilient arms formed on the circumference thereof whereby said disk is resiliently suspended between said backing plate and said pressure plate, brake operating means controllable from the vehicle and adapted to move said pressure plate in the direction of said backing plate to engage the braking surfaces of said friction member between said pressure plate and said backing plate, and means for dissipating the heat created in said brake during the engagement of said pressure plate, friction disk and backing plate and including slots extending across the surface of said pressure plate facing said friction disk, additional slots extending across the surface of said backing plate also facing said friction disk and a rotatable air induction member driven from the vehicle hub for driving an air stream over the pressure plate and through the slots therein and through the slots in the backing plate for air cooling the braking mechanism.

4. A vehicle brake mechanism having a stationary aluminum alloy backing plate, an aluminum alloy pressure plate resiliently mounted on said backing plate for limited movement axially and circumferentially thereof, a rotatable friction disk drivingly connected to the vehicle hub and suspended between said backing plate and said pressure plate, brake operating means adapted to move said pressure plate toward said backing plate to engage said friction disk between said backing plate and said pressure plate, and means for dissipating the heat created in said brake during the engagement of said pressure plate, friction disk and backing plate, and including heat radiating fins formed on said pressure plate, slots formed in the surface of said pressure plate facing said friction disk and a rotatable air induction member driven by the vehicle hub for forcing air over said fins and through said slots to cool the brake.

5. A claim according to claim 4 in which the backing plate is provided with heat radiating fins and with slots formed in its surface facing the friction disk whereby air is forced by the air induction member through said slots and separate air streams wash the heat radiating fins on said backing plate.

6. A vehicle brake mechanism having a stationary backing plate formed of an aluminum alloy, a pressure plate also formed of an aluminum alloy and movable relative to said backing plate, a rotatable friction disk resiliently suspended between said pressure plate and said backing plate, brake operating means including a bent operating lever pivotally connected at each of its free ends to said backing plate and articulately connected near said pivotal connections to said pressure plate thereby being adapted to move said pressure plate into engagement with a braking surface of said friction disk, and means for driving said rotatable friction disk and for cooling said brake and including a rotatable air induction member driven from the vehicle hub and connected in driving relation with said friction disk.

7. A vehicle brake mechanism having a stationary backing plate formed of an aluminum alloy, a pressure plate also formed of an aluminum alloy and movable relative to said backing plate, a rotatable friction disk resiliently suspended between said pressure plate and said backing plate, brake operating means including a bent operating lever pivotally connected at each of its free ends to said backing plate and articulately connected near said pivotal connections to said pressure plate thereby being adapted to move said pressure plate into engagement with a braking surface of said friction disk, said brake operating means also including a cable connected to said bent operating lever and a compression spring surrounding the connecting portion of said cable and seated between said lever and said backing plate whereby movement of said lever into a braking position exerts a compression force on said spring which is effective to return said lever to a non-braking position on release of the brake applying force, and means for driving said rotatable friction disk and for cooling said brake and including a rotatable air induction member driven from the vehicle hub and connected in driving relation with said friction disk.

8. A vehicle brake mechanism having a stationary plate, an additional plate mounted on and spaced from said stationary plate for movement relative thereto, each of said plates having a braking surface consisting chiefly of aluminum, a rotatable friction member drivingly connected to the vehicle wheel and resiliently interposed in the space between said plates, brake operating means for moving said additional plate toward said stationary plate to engage said friction disk between the braking surfaces of said plate, and brake cooling means including a rotatable air induction member connected to the vehicle wheel for rotation therewith.

9. A disk brake mechanism for a vehicle, comprising a fixed backing plate, a pressure plate movable relative to said backing plate, each of said plates having a braking surface consisting chiefly of aluminum, a rotatable friction disk disposed between said plates, brake operating means for moving said pressure plate toward said backing plate to engage said friction disk between the braking surfaces of said plates, and brake cooling means comprising a metallic sheet rotatably secured to the vehicle wheel and provided with openings and air deflectors adjacent said openings for directing air into the interior of the mechanism on rotation of the vehicle wheel, and air conducting passages in at least one of said plates, whereby a cooling air stream passes through said passages when said vehicle wheel is rotating.

10. A disk brake mechanism for a vehicle, comprising a backing plate formed of an aluminum alloy, a pressure plate carried by said backing plate also formed of an aluminum alloy, a rotatable friction member suspended betwen said plate and drivingly connected with the vehicle wheel, brake operating means adapted to move said pressure plate in the direction of said backing plate to engage the braking surfaces of said friction member between said pressure plate and said backing plate, and brake cooling means attached to the vehicle wheel and comprising a substantially dish-shaped metallic plate having louver-like openings providing impeller means for circulating air through the interior of the mechanism, and an air duct system comprising air conducting passages in said pressure plate and in said backing plate, through which streams of air are driven by said impeller when said wheel is rotated.

11. A disk brake mechanism for a vehicle, comprising a backing plate formed of an aluminum alloy, a pressure plate carried by said backing plate and also formed of an aluminum alloy, a rotatable friction member suspended between said plates and drivingly connected with the vehicle wheel, brake operating means adapted to move said pressure plate in the direction of said backing plate to engage the braking surfaces of said friction member between said pressure plate and said backing plate, and brake cooling means including heat radiating fins provided on said pressure plate and air circulating means attached to the vehicle wheel and including a substantially dish-shaped metallic plate having louver-like openings forming air scoops for introducing air into the interior of the mechanism, and an air duct system comprising air conducting passages in said pressure plate and in said backing plate whereby heat generated in said braking mechanism is conducted therefrom by cooling air streams flowing therethrough and heat is radiated from said backing plate through heat radiating fins.

JOSEPH M. MILAN.